L. R. BUCKENDALE.
CLUTCH.
APPLICATION FILED OCT. 14, 1919.
1,384,511.
Patented July 12, 1921.
3 SHEETS—SHEET 3.
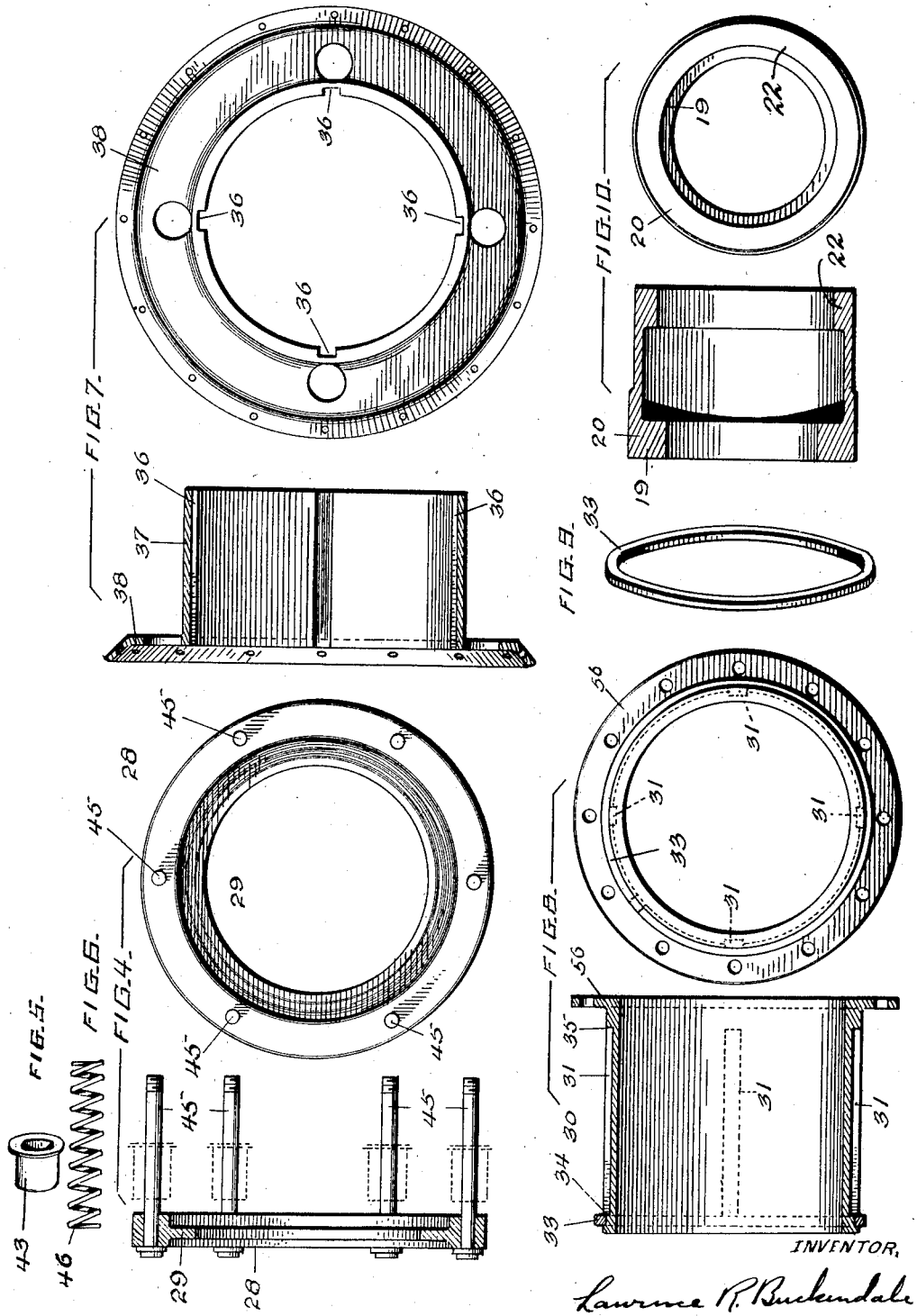

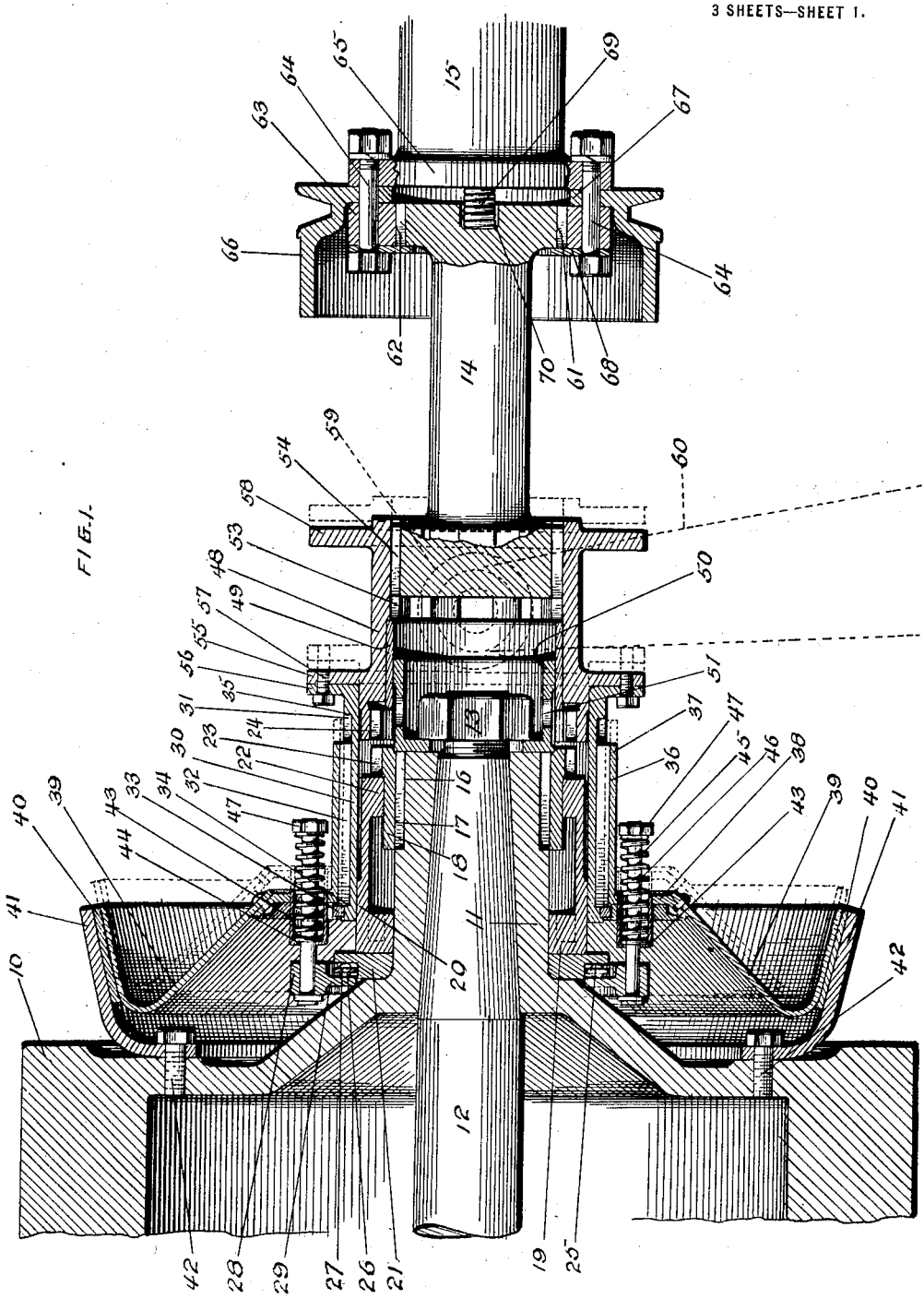

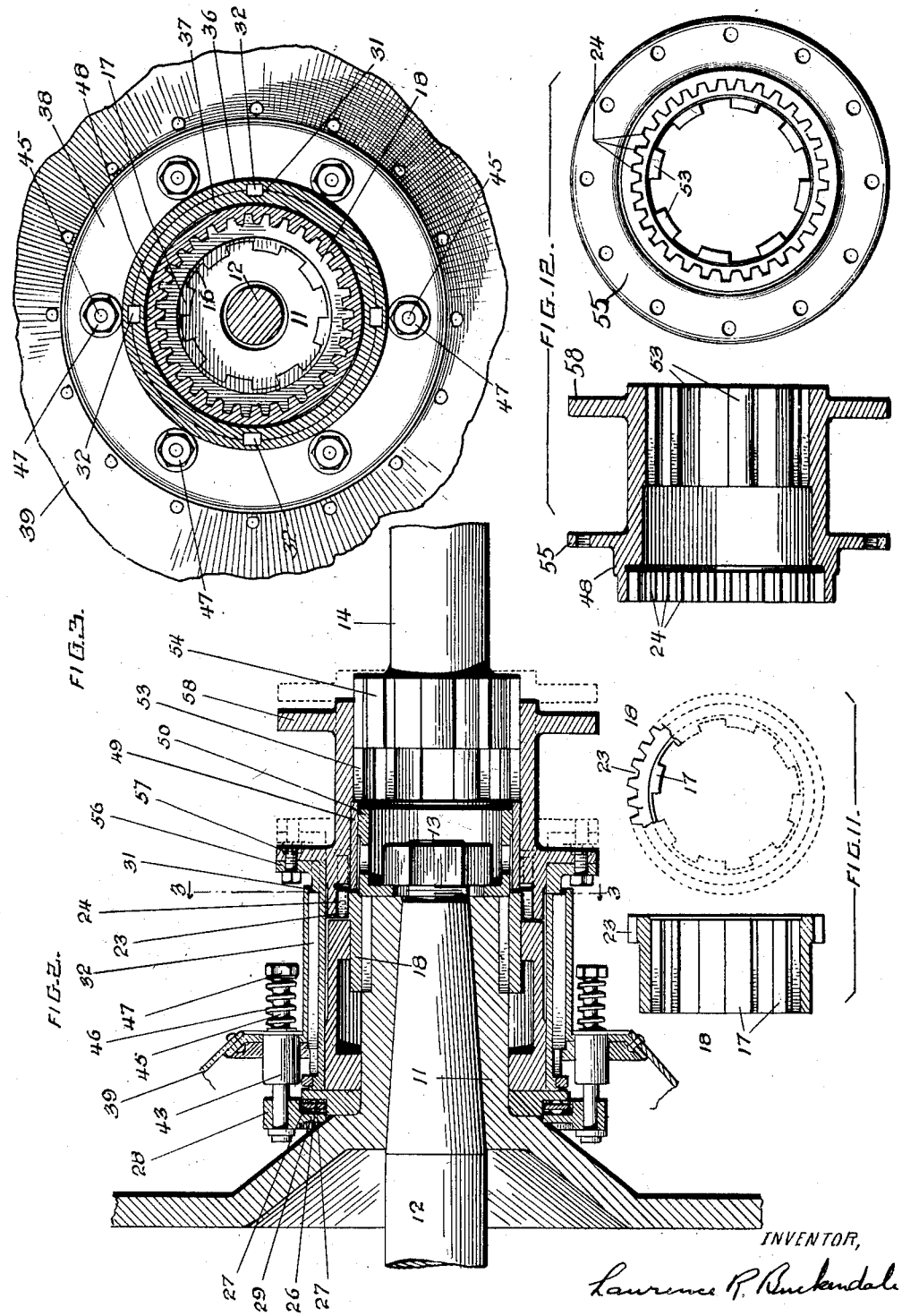

UNITED STATES PATENT OFFICE.

LAWRENCE R. BUCKENDALE, OF THE UNITED STATES ARMY, ASSIGNOR TO NEWTON D. BAKER, SECRETARY OF WAR, TRUSTEE.

CLUTCH.

1,384,511.   Specification of Letters Patent.   Patented July 12, 1921.

Application filed October 14, 1919. Serial No. 330,670.

(FILED UNDER THE ACT OF MARCH 3, 1883, 22 STAT. L., 625.)

*To all whom it may concern:*

Be it known that I, LAWRENCE R. BUCKENDALE, United States Army, a citizen of the United States, stationed at Detroit, Michigan, have invented an Improvement in Clutches, of which the following is a specification.

The invention described herein may be used by the Government, or any of its officers or employees in prosecution of work for the Government, or by any other person in the United States, without payment of any royalty thereon.

This invention relates to clutches generally but more specifically to compound clutches, for use on motor driven vehicles of great weight, wherein the inertia of the heavy mass is gradually overcome by providing for, first a slipping and then a positive engagement of the clutch members.

Motor driven vehicles such as war material, with special reference to tractors and tanks are in many instances very heavy and so constructed, for instance those of the track laying type, that they have little or no movement due to momentum, owing to friction of the parts and therefore, as soon as the motive power is discontinued, the vehicle immediately stops, and provision must be made for the movement of the mass from a standing position, irrespective of the speed desired.

Tractors and tanks are also provided with separate traction means made up of chains of track shoes, one on each side of the machine, and said chains are adapted to operate jointly or separately. In view of the above facts it has been found necessary to provide a very substantial transmission mechanism of great weight, which when added to the weight of the vehicle, requires the use of a form of clutch, that will pick up the load gradually to avoid damage to the parts.

The object is to provide a structure that will withstand the intense torsion applied thereto, and be as light as possible in construction.

Another object is to provide a structure of a simple durable and inexpensive character, wherein no special means are necessary to operate the compound clutch through its progressive steps, said operations being performed by a one way movement of the operating lever.

Similar numerals indicate corresponding parts in all the figures of the drawings in which:—

Figure 1 is a longitudinal sectional view of the improved clutch showing the clutch entirely disconnected in dotted lines and in frictional contact in full lines;

Fig. 2 is a fragmentary sectional view with parts in frictional contact in dotted lines and in positive engagement in full lines;

Fig. 3 is a transverse section on line 3—3, of Fig. 2;

Fig. 4 shows a section and face view of the clutch spring stop ring;

Fig. 5 is a detail perspective view of one of the spring retainers;

Fig. 6 is a similar view of one of the clutch springs;

Fig. 7 shows sectional and face views of the cone clutch drum collar.

Fig. 8 shows similar views of the clutch sliding collar;

Fig. 9 is a detail perspective view of the snap ring;

Fig. 10 shows sectional and face views of the clutch bearing;

Fig. 11 shows a similar view of the clutch sleeve; and

Fig. 12 shows a similar view of the clutch coupling.

Referring to the drawings by numerals, 10 indicates the fly wheel of a motor (not shown). Said fly wheel is provided with an extension 11, mounted rigidly on the tapered shank of the crank shaft 12 by means of a key or the like, and retained by nut 13 threaded on the end of the crank shaft.

On the extension 11 of the fly wheel is mounted the inner parts of the clutch that operate constantly with the motor. The intermittently operating members of the clutch are mounted on said inner members and extend beyond them for connection with and transfer of power to the Cardan shaft 14, and by it to the driven shaft 15.

The fly wheel extension 11 is provided near its outer end with splines or teeth 16, seated in corresponding splines or teeth 17 in the clutch sleeve 18. This coupling between the fly wheel extension and clutch sleeve is permanent and undisturbed except when disassembling the parts.

The extension 11 is provided at its inner end with a seat for the reception of the inner end 19 of clutch bearing 20 and the clutch spring thrust collar 21. The outer end of the bearing 20 is provided with an enlargement 22, mounted on the outer face of the clutch sleeve 18. The clutch sleeve 18 is provided with splines 23 on its outer face for engagement with corresponding splines 24 on the clutch coupling 48, which forms the positive connection between the members of the clutch.

The clutch spring thrust collar 21 is provided with a ball race 25, and the clutch spring stop ring 28 has a flange 29 formed with a ball race, and the balls 26 carried by the ball retainer 27 operate between the ball races thus formed thereby providing a ball thrust bearing connection between flange 29 and collar 21.

Mounted for rotary and longitudinal movement on the clutch bearing member 20, is the clutch sliding collar 30 provided in its outer surface with preferably four grooves 31 in which keys 32 are adapted to have a limited longitudinal movement.

A clutch snap ring 33 seated in groove 34 in the collar 30 offers a stop for the keys 32 at one end and a shoulder 35 limits the movement of the keys in the opposite direction.

The keys 32 are also seated in grooves 36 formed in the inner face of the cone clutch drum collar 37. The keys 32 lock the clutch sliding collar 30 and the cone clutch drum collar 37 together to prevent any relative rotary movement but permit some relative longitudinal movement of such parts. Said longitudinal movement between the parts 30 and 37 allows the carrying members to first bring the cone clutch members together to provide the initial slipping engagement to gradually start the load, and said movement also provides for the subsequent positive engagement between splines 23 and 24 after the load has first been started by said engagement of the cone members of the clutch.

The cone clutch drum collar 37 is provided with a flange 38, on the outer peripheral edge of which is mounted the inner or male cone clutch drum 39, provided with any preferred form of facing 40 for contact with the outer or female clutch drum 41 mounted by bolts 42 on the fly wheel.

The flange 38 of the cone clutch drum collar is provided with a plurality of openings in which flanged spring retainers 43 are mounted. The retainers 43 have central openings 44 through which plunger rods 45 extend, said rods being surrounded by springs 46 seated at one end in the retainers and at their other ends bearing against spring abutment nuts 47.

The plunger rods 45 are mounted at one end in the clutch spring stop ring 28, and springs 46 operate to force the inner cone clutch drum 39 into contact with the outer clutch drum, when the clutch sliding collar 30 is adjusted to permit said contact.

The clutch coupling 48 is provided throughout about one half of its inner surface with the bearing bushing 49 mounted for rotary and longitudinal movement on clutch end or clutch coupling bearing ring 50. Said end bearing ring is preferably provided with perforation 51 for lubricating purposes and is securely mounted on the end of the crank shaft 12 beneath the nut 13.

The remainder of the internal face of the coupling 48 is provided with splines 53 adapted to mesh with corresponding splines 54 on the Cardan shaft 14, to which power is transferred. Power is transferred by the Cardan shaft to the driven shaft 15.

The clutch coupling 48 is further provided near one end with a flange 55 to which a flange 56 of the clutch sliding collar 30 is secured by bolts 57. Between said flange 55 and a flange 58, preferably formed integral with the coupling 48, near its other end, are antifriction rollers 59 mounted at the end of rocker arms 60 which are adapted to operate the clutch to partially disengaged position, or to the entirely disengaged position.

The Cardan shaft 14 is provided at one end with splines 54 for engagement with splines 53 in the coupling 48, and at its other end with splines 61 for engagement with splines 62 in the coupling box 63. The coupling box 63 is secured by bolts 64 to a flange 65 of the driven shaft 15.

The brake drum 66 is provided with a flange 67 secured between the flange 65 and coupling box 63. The coupling cover 68 is also secured in place by bolts 64.

The coupling between the parts at both ends of the Cardan shaft are preferably of a character to permit of slight relative movement between the parts, and a thrust spring 69, seated in a depression 70 in the end of the Cardan shaft is adapted to press against the end of the driven shaft and prevent rattling.

The operation of the compound clutch in the transfer of driving power provides for gradually overcoming the inertia of the heavy mass by first a slipping engagement between the frictional cone clutch drums and then a positive engagement of the splines of the clutch coupling and clutch sleeve.

When the clutch is moved to the position shown in dotted lines, Fig. 1, or entirely disconnected from the fly wheel 10 through the rocking of rocker arms 60, the female friction cone clutch drum 41, fly wheel extension 11, clutch spring thrust collar 21, inner bearing 20, sleeve 18 and end bearing ring 50, continue to revolve with the engine shaft, but the remaining parts consisting of the Cardan shaft 14, coupling 48, sliding collar 30, cone clutch collar 37, and male friction cone clutch drum 39, become inactive or stationary.

When the parts are moved into the position shown in full lines in Fig. 1, the cone clutch drums 39 and 41 are brought into contact, or in other words, cone 39 is forced into contact with cone 41 by the springs 46, said springs having a tendency to normally hold the cones in frictional contact, and conversely, said contact is discontinued by moving the cone clutch collar 37 against the tension of the springs 46.

In the dotted line position in Fig. 1, the snap ring 33 is in contact with the ends of keys 32 and cone clutch collar 37, the latter, under control of rockers 60 being the means whereby the male cone drum 39 is withdrawn from contact with female cone drum 41, against the tension of springs 46.

In the full line position in Fig. 1, the snap ring 33 is a slight distance from the end of cone clutch drum collar 37, and the cones are held together by springs 46.

When in the position as last described, shown in full lines Fig. 1, the cones 39 and 41 are in engagement, but splines 23 and 24 on clutch sleeve 18 and clutch coupling 48, respectively, are not engaged because the rocker arms 60 have been only partially moved forward. When the driven parts of the clutch have reached the same speed as the driving parts, the positive engagement of the clutch may be accomplished by simply moving the rocker arms 60 toward the fly wheel and the parts 48 and 30 will be moved, in the same direction, until teeth 24 engage teeth 23, said second movement being in the same direction as the first, but not taking place until rocker arms 60 have been moved sufficiently forward to completely release the movable cone 39.

When the cone clutch only is engaged, the drive is through inner cone 39, cone clutch drum collar 37, keys 32, clutch sliding collar 30, coupling 48, Cardan shaft 14 to the driven shaft 15. However, when the teeth 23 and 24 are engaged, the drive is direct through crank shaft 12, fly wheel extension 11, clutch sleeve 18, teeth 23, 24, coupling 48, Cardan shaft 14 to the driven shaft 15.

A brake applied to drum 66 stops the rotation of the Cardan shaft when the clutch is disengaged, so that proper gear shift of the transmission mechanism (not shown) can be made, without danger of stripping the gear teeth. This is especially important when it is desired to reverse the mechanism.

What I claim is:—

1. A compound clutch having in combination with a drive shaft, a friction clutch member, a positive clutch sleeve having splines, and a bearing member mounted to rotate with the shaft, a coupling member having splines for engagement with the clutch sleeve splines, a sliding collar secured to the coupling member and mounted for rotary and longitudinal movement on the bearing member, a friction clutch member mounted on the sliding collar for yielding engagement with said friction clutch member mounted to operate with said shaft and a driven member connected to said coupling member.

2. A compound clutch, in combination with a drive shaft having a friction clutch member, a clutch sleeve, a clutch bearing and coupling bearing mounted on the drive shaft, a driven shaft, a coupling member splined to the driven shaft, and mounted for rotation on said coupling bearing, a friction clutch member mounted on the coupling member, and means for yieldingly engaging the friction clutch members and positively engaging the clutch sleeve and the coupling member.

3. A compound clutch, in combination with a drive shaft, having a friction clutch member, a clutch sleeve having splines, a clutch bearing and a coupling bearing, a driven shaft, a coupling slidably keyed to the driven shaft and having splines for engagement with the splines on the clutch sleeve, a sliding collar secured to the coupling and mounted for rotary and longitudinal movement on the clutch bearing, a friction clutch collar mounted on the sliding collar for slight longitudinal movement thereon and having a friction clutch member mounted thereon, and means for progressively engaging the friction members and the splines on the clutch sleeve and coupling.

4. A compound clutch, in combination with a driving and a driven shaft, of an outer friction cone clutch drum, a positive clutch member, a sliding collar bearing and a coupling bearing mounted to operate with the drive shaft, and a coupling member keyed to the driven shaft having means for positive engagement with the positive clutch member on the driving shaft, and an inner friction cone clutch drum mounted on the coupling member for yielding engagement with the outer friction cone clutch drum.

LAWRENCE R. BUCKENDALE.